US006604071B1

(12) United States Patent
Cox et al.

(10) Patent No.: US 6,604,071 B1
(45) Date of Patent: Aug. 5, 2003

(54) SPEECH ENHANCEMENT WITH GAIN LIMITATIONS BASED ON SPEECH ACTIVITY

(75) Inventors: Richard Vandervoort Cox, New Providence, NJ (US); Rainer Martin, Aachen (DE)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/499,985

(22) Filed: Feb. 8, 2000

Related U.S. Application Data

(60) Provisional application No. 60/119,279, filed on Feb. 9, 1999.

(51) Int. Cl.[7] .......... G01L 21/02
(52) U.S. Cl. .......... 704/225
(58) Field of Search .......... 704/225–228, 704/233

(56) References Cited

U.S. PATENT DOCUMENTS

| | | | | | |
|---|---|---|---|---|---|
| 4,623,980 | A | | 11/1986 | Vary | |
| 4,811,404 | A | * | 3/1989 | Vilmur et al. | 381/94.3 |
| 5,012,519 | A | | 4/1991 | Adlersberg et al. | |
| 5,133,013 | A | * | 7/1992 | Munday | 704/226 |
| 5,214,742 | A | * | 5/1993 | Edler | 704/203 |
| 5,485,515 | A | | 1/1996 | Allen et al. | |
| 5,572,621 | A | * | 11/1996 | Martin | 704/227 |
| 5,706,395 | A | * | 1/1998 | Arslan et al. | 704/226 |
| 5,742,927 | A | * | 4/1998 | Crozier et al. | 704/226 |
| 5,839,101 | A | | 11/1998 | Vähätalo et al. | |
| 6,351,731 | B1 | * | 2/2002 | Anderson et al. | 704/233 |

OTHER PUBLICATIONS

Pct International Application No. PCT/US00/03372 filed Sep. 2, 2000, "Written Opinion," Feb. 20, 2001.

Vaidyanathan, P. P., *Multirate Systems and Filter Banks*, (Prentice Hall P.T.R., Englewood Cliffs, N.J.) 1993, pp. vii–xi.

Doblinger, G., "Computationally Efficient Speech Enhancement By Special Minima Tracking in Subbands," *Proc. Eurospeech*, vol. 2, pp. 1513–1516, 1995.

(List continued on next page.)

*Primary Examiner*—Marsha D. Banks-Harold
*Assistant Examiner*—Donald L. Storm

(57) ABSTRACT

An apparatus and method for data processing that improves estimation of spectral parameters of speech data and reduces algorithmic delay in a data coding operation. Estimation of spectral parameters is improved by adaptively adjusting a gain function used to enhance data based on whether the data contains information speech and noise or noise only. A determination is made concerning whether the speech signal to be processed represents articulated speech or a speech pause and a gain is formed for application to the speech signal. The lowest value the gain may assume (i.e., its lower limit) is determined based on whether the speech signal is known to represent articulated speech or not. The lower limit of the gain during periods of speech activity is constrained to be lower than the lower limit of the gain during speech pause. Also, the gain that is applied to a data frame of the speech signal is adaptively limited based on limited a priori signal-to-noise (SNR) values. Smoothing of the lower limit of the a priori SNR values is performed using a first order recursive system which uses a previous lower limit and a preliminary lower limit. Delay is reduced by extracting coding parameters using incompletely processed data.

8 Claims, 5 Drawing Sheets

OTHER PUBLICATIONS

McAulay, R. J. and M. L. Malpass, "Speech Enhancement Using a Soft–Decision Noise Suppression Filter," IEEE Trans. on Acoustics, Speech and Signal Processing, vol. 28, No. 2, pp. 137–145, Apr., 1980.

Martin, R. et al., "New Speech Enhancement Techniques for Low Bit Rate Speech Coding," Proceedings of 1999 IEEE Workshop on Speech Coding Proceedings. Model, Coders, and Error Criteria, Porvoo, Finland, Jun. 20–23, 1999, pp. 165–167, XP002139862 1999, Piscataway, NJ, USA.

Scalart P. et al., Speech Enhancement Based on A Priori Signal to Noise Estimation, "1996 IEEE International Conf on Acoustics, Speech and Signal Processing Conference Proceedings," Atlanta, GA, 7–10 M., pp. 629–632, vol. 2, XP002139863, 1996, New York, NY.

PCT Search Report, International Application No. PCT/US00/03372 filed Feb. 9th, 2000.

Cappe, Olivier, "Elimination of the Musical Noise Phenomenon with the Ephraim and Malah Noise Suppressor," IEEE Trans. on Speech and Audio Proc., vol. 2, No. 2, Apr. 1994, pp. 345–349.

Ephraim, Y. et al, "Speech Enhancement Using a Minimum Mean–Square Error Log–Spectral Amplitude Estimator," IEEE Trans. on Acoustics, Speech and Signal Proc., vol. ASSP–33, No. 2, Apr. 1985, pp. 443–445.

Ephraim, Y. et al, "Speech Enhancement Using a Minimum Mean–Square Error Short–Time Spectral Amplitude Estimator, IEEE Trans. on Acoustics, Speech and Signal Proc.," vol. ASSP–32, No. 6, Dec. 1984, pp. 1109–1121.

McCree, A. et al., "A 2.4 KBIT/S MELP Coder Candidate for the New U.S. Federal Standard," IEEE, 1996, Call No. 0–7803–3192–3/96, pp. 200–203.

Malah, D. et al., "Tracking Speech–Presence Uncertainty to Improve Speech Enhancement in Non–Stationary Noise Environments," IEEE, International Conf. Speech, Audio, and Signal Proc., Phoenix, AZ, 1999.

Martin, R., "Spectral Subtraction Based on Minimum Statistics," Proc. European Signal Processing Conference, vol. 1, 1994, 1182–1185.

* cited by examiner

10

SPEECH ENHANCEMENT WITH GAIN LIMITATIONS BASED ON SPEECH ACTIVITY

CROSS-REFERENCE TO RELATED APPLICATIONS

This application claims the benefit of the filing date of U.S. Provisional Application No. 60/119,279, filed Feb. 9, 1999, and is incorporated herein by reference.

COMPUTER PROGRAM LISTING APPENDIX ON COMPACT DISC

There is a computer program listing of a software appendix which has been submitted in two (2) identical copies to the U.S. Patent and Trademark Office on CD-ROM, the contents of which are hereby incorporated by reference. These CD-ROM copies, created in October, 2002, contain the following files (in alphabetical order):

| File Name |
|---|
| dsp_sub.c |
| dsp_sub.h |
| enh_fun.c |
| enh_fun.h |
| enhance.c |
| enhance.h |
| fftreal.c |
| fftreal.h |
| globals.h |
| main.c |
| mat.h |
| mat_lib.c |
| melp.c |
| melp_ana.c |
| vect_fun.c |
| vect_fun.h |
| windows.h |

FIELD OF THE INVENTION

This invention relates to enhancement processing for speech coding (i.e., speech compression) systems, including low bit-rate speech coding systems such as MELP.

BACKGROUND OF THE INVENTION

Low bit-rate speech coders, such as parametric speech coders, have improved significantly in recent years. However, low-bit rate coders still suffer from a lack of robustness in harsh acoustic environments. For example, artifacts introduced by low bit-rate parametric coders in medium and low signal-to-noise ratio (SNR) conditions can affect intelligibility of coded speech.

Tests show that significant improvements in coded speech can be made when a low bit-rate speech coder is combined with a speech enhancement preprocessor. Such enhancement preprocessors typically have three main components: a spectral analysis/synthesis system (usually realized by a windowed fast Fourier transform/inverse fast Fourier transform (FFT/IFFT), a noise estimation process, and a spectral gain computation. The noise estimation process typically involves some type of voice activity detection or spectral minimum tracking technique. The computed spectral gain is applied only to the Fourier magnitudes of each data frame (i.e., segment) of a speech signal. An example of a speech enhancement preprocessor is provided in Y. Ephraim et al., "Speech Enhancement Using a Minimum Mean-Square Error Log-Spectral Amplitude Estimator," IEEE Trans. Acoustics, Speech and Signal Processing, Vol. 33, pp. 443–445, April 1985, which is hereby incorporated by reference in its entirety. As is conventional, the spectral gain comprises individual gain values to be applied to the individual subbands output by the FFT process.

A speech signal may be viewed as representing periods of articulated speech (that is, periods of "speech activity") and speech pauses. A pause in articulated speech results in the speech signal representing background noise only, while a period of speech activity results in the speech signal representing both articulated speech and background noise. Enhancement preprocessors function to apply a relatively low gain during periods of speech pauses (since it is desirable to attenuate noise) and a higher gain during periods of speech (to lessen the attenuation of what has been articulated). However, switching from a low to a high gain value to reflect, for example, the onset of speech activity after a pause, and vice-versa, can result in structured "musical" (or "tonal") noise artifacts which are displeasing to the listener. In addition, enhancement preprocessors themselves can introduce degradations in speech intelligibility as can speech coders used with such preprocessors.

To address the problem of structured musical noise, some enhancement preprocessors uniformly limit the gain values applied to all data frames of the speech signal. Typically, this is done by limiting an "a priori" signal to noise ratio (SNR) which is a functional input to the computation of the gain. This limitation on gain prevents the gain applied in certain data frames (such as data frames corresponding to speech pauses) from dropping too low and contributing to significant changes in gain between data frames (and thus, structured musical noise). However, this limitation on gain does not adequately ameliorate the intelligibility problem introduced by the enhancement preprocessor or the speech coder.

SUMMARY OF THE INVENTION

The present invention overcomes the problems of the prior art to both limit structured musical noise and increase speech intelligibility. In the context of an enhancement preprocessor, an illustrative embodiment of the invention makes a determination of whether the speech signal to be processed represents articulated speech or a speech pause and forms a unique gain to be applied to the speech signal. The gain is unique in this context because the lowest value the gain may assume (i.e., its lower limit) is determined based on whether the speech signal is known to represent articulated speech or not. In accordance with this embodiment, the lower limit of the gain during periods of speech pause is constrained to be higher than the lower limit of the gain during periods of speech activity.

In the context of this embodiment, the gain that is applied to a data frame of the speech signal is adaptively limited based on limited a priori SNR values. These a priori SNR values are limited based on (a) whether articulated speech is detected in the frame and (b) a long term SNR for frames representing speech. A voice activity detector can be used to distinguish between frames containing articulated speech and frames that contain speech pauses. Thus, the lower limit of a priori SNR values may be computed to be a first value for a frame representing articulated speech and a different second value, greater than the first value, for a frame representing a speech pause. Smoothing of the lower limit of the a priori SNR values is performed using a first order recursive system to provide smooth transitions between active speech and speech pause segments of the signal.

An embodiment of the invention may also provide for reduced delay of coded speech data that can be caused by the enhancement preprocessor in combination with a speech coder. Delay of the enhancement preprocessor and coder can be reduced by having the coder operate, at least partially, on incomplete data samples to extract at least some coder parameters. The total delay imposed by the preprocessor and coder is usually equal to the sum of the delay of the coder and the length of overlapping portions of frames in the enhancement preprocessor. However, the invention takes advantage of the fact that some coders store "look-ahead" data samples in an input buffer and use these samples to extract coder parameters. The look-ahead samples typically have less influence on the quality of coded speech than other samples in the input buffer. Thus, in some cases, the coder does not need to wait for a fully processed, i.e., complete, data frame from the preprocessor, but instead can extract coder parameters from incomplete data samples in the input buffer. By operating on incomplete data samples, delay of the enhancement preprocessor and coder can be reduced without significantly affecting the quality of the coded data.

For example, delay in a speech preprocessor and speech coder combination can be reduced by multiplying an input frame by an analysis window and enhancing the frame in the enhancement preprocessor. After the frame is enhanced, the left half of the frame is multiplied by a synthesis window and the right half is multiplied by an inverse analysis window. The synthesis window can be different from the analysis window, but preferably is the same as the analysis window. The frame is then added to the speech coder input buffer, and coder parameters are extracted using the frame. After coder parameters are extracted, the right half of the frame in the speech coder input buffer is multiplied by the analysis and the synthesis window, and the frame is shifted in the input buffer before the next frame is input. The analysis windows, and synthesis window used to process the frame in the coder input buffer can be the same as the analysis and synthesis windows used in the enhancement preprocessor, or can be slightly different, e.g., the square root of the analysis window used in the preprocessor. Thus, the delay imposed by the preprocessor can be reduced to a very small level, e.g., 1–2 milliseconds.

These and other aspects of the invention will be appreciated and/or obvious in view of the following description of the invention.

BRIEF DESCRIPTION OF THE DRAWINGS

The invention is described in connection with the following drawings where reference numerals indicate like elements and wherein.

DETAILED DESCRIPTION

A. Introduction to Illustrative Embodiments

As is conventional in the speech coding art, the illustrative embodiment of the present invention is presented as comprising individual functional blocks (or "modules"). The functions these blocks represent may be provided through the use of either shared or dedicated hardware, including, but not limited to, hardware capable of executing software. For example, the functions of blocks 1–5 presented in FIG. 1 may be provided by a single shared processor. (Use of the term "processor" should not be construed to refer exclusively to hardware capable of executing software.)

Illustrative embodiments may be realized with digital signal processor (DSP) or general purpose personal computer (PC) hardware, available from any of a number of manufacturers, read-only memory (ROM) for storing software performing the operations discussed below, and random access memory (RAM) for storing DSP/PC results. Very large scale integration (VLSI) hardware embodiments, as well as custom VLSI circuitry in combination with a general purpose DSP/PC circuit, may also be provided.

Figure 1:
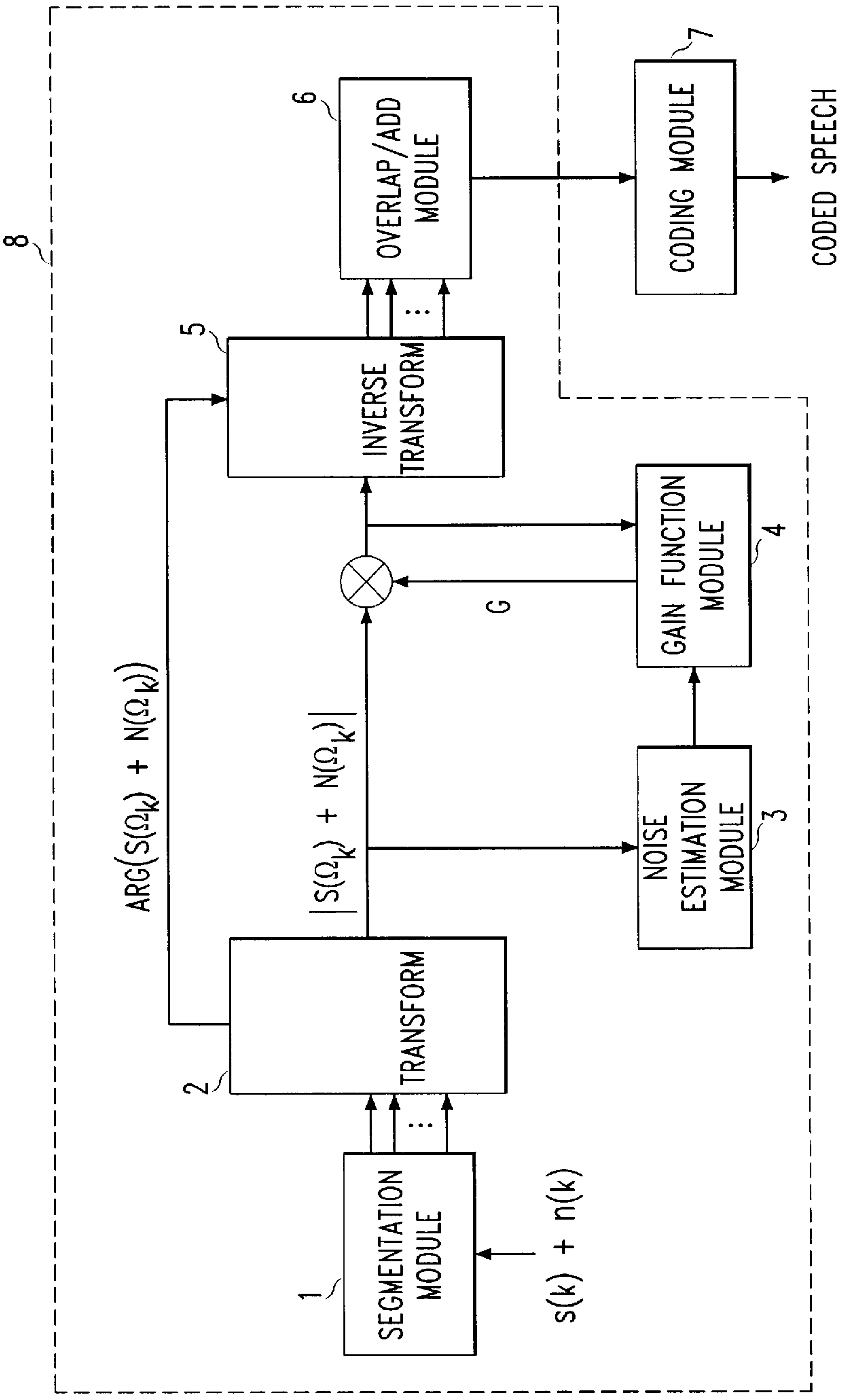
FIG. 1 is a schematic block diagram of an illustrative embodiment of the invention.

Illustrative software for performing the functions presented in FIG. 1 is provided in the Software Appendix hereto.

B. The Illustrative Embodiment

FIG. 1 presents a schematic block diagram of an illustrative embodiment 8 of the invention. As shown in FIG. 1, the illustrative embodiment processes various signals representing speech information. These signals include a speech signal (which includes a pure speech component, $s(k)$, and a background noise component, $n(k)$), data frames thereof, spectral magnitudes, spectral phases, and coded speech. In this example, the speech signal is enhanced by a speech enhancement preprocessor 8 and then coded by a coder 7. The coder 7 in this illustrative embodiment is a 2400 bps MIL Standard MELP coder, such as that described in A. McCree et al., "A 2.4 KBIT/S MELP Coder Candidate for the New U.S. Federal Standard," Proc., IEEE Intl. Conf. Acoustics, Speech, Signal Processing (ICASSP), pp. 200–203, 1996, which is hereby incorporated by reference in its entirety. FIGS. 2, 3, 4, and 5 present flow diagrams of the processes carried out by the modules presented in FIG. 1.

1. The Segmentation Module

The speech signal, $s(k)+n(k)$, is input into a segmentation module 1. The segmentation module 1 segments the speech signal into frames of 256 samples of speech and noise data (see step 100 of FIG. 2; the size of the data frame can be any desired size, such as the illustrative 256 samples), and applies an analysis window to the frames prior to transforming the frames into the frequency domain (see step 200 of FIG. 2). As is well known, applying the analysis window to the frame affects the spectral representation of the speech signal.

The analysis window is tapered at both ends to reduce cross talk between subbands in the frame. Providing a long taper for the analysis window significantly reduces cross talk, but can result in increased delay of the preprocessor and coder combination 10. The delay inherent in the preprocessing and coding operations can be minimized when the frame advance (or a multiple thereof) of the enhancement preprocessor 8 matches the frame advance of the coder 7. However, as the shift between later synthesized frames in the enhancement preprocessor 8 increases from the typical half-overlap (e.g., 128 samples) to the typical frame shift of the coder 7 (e.g., 180 samples), transitions between adjacent frames of the enhanced speech signal $\hat{s}(k)$ become less smooth. These discontinuities arise because the analysis window attenuates the input signal-most at the edges of each frame and the estimation errors within each frame tend to spread out evenly over the entire frame. This leads to larger relative errors at the frame boundaries, and the resulting discontinuities, which are most notable for low SNR conditions, can lead to pitch estimation errors, for example.

Discontinuities may be greatly reduced if both an analysis and synthesis windows are used in the enhancement preprocessor 8. For example, the square root of the Tukey window $$w(i) = \begin{cases} \sqrt{0.5(1-\cos(\pi i/M_0))} & \text{for } 1 \le i \le M_0 \\ \sqrt{0.5(1-\cos(\pi(M-i)/M_0))} & \text{for } M-M_0 \le i \le M \\ 1 & \text{otherwise} \end{cases} \quad (1)$$

gives good performance when used as both an analysis and a synthesis window. M is the frame size in samples and $M_o$ is the length of overlapping sections of adjacent synthesis frames.

Windowed frames of speech data are next enhanced. This enhancement step is referenced generally as step 300 of FIG. 2 and more particularly as the sequence of steps in FIGS. 3, 4, and 5.

2. The Transform Module

Figure 3:
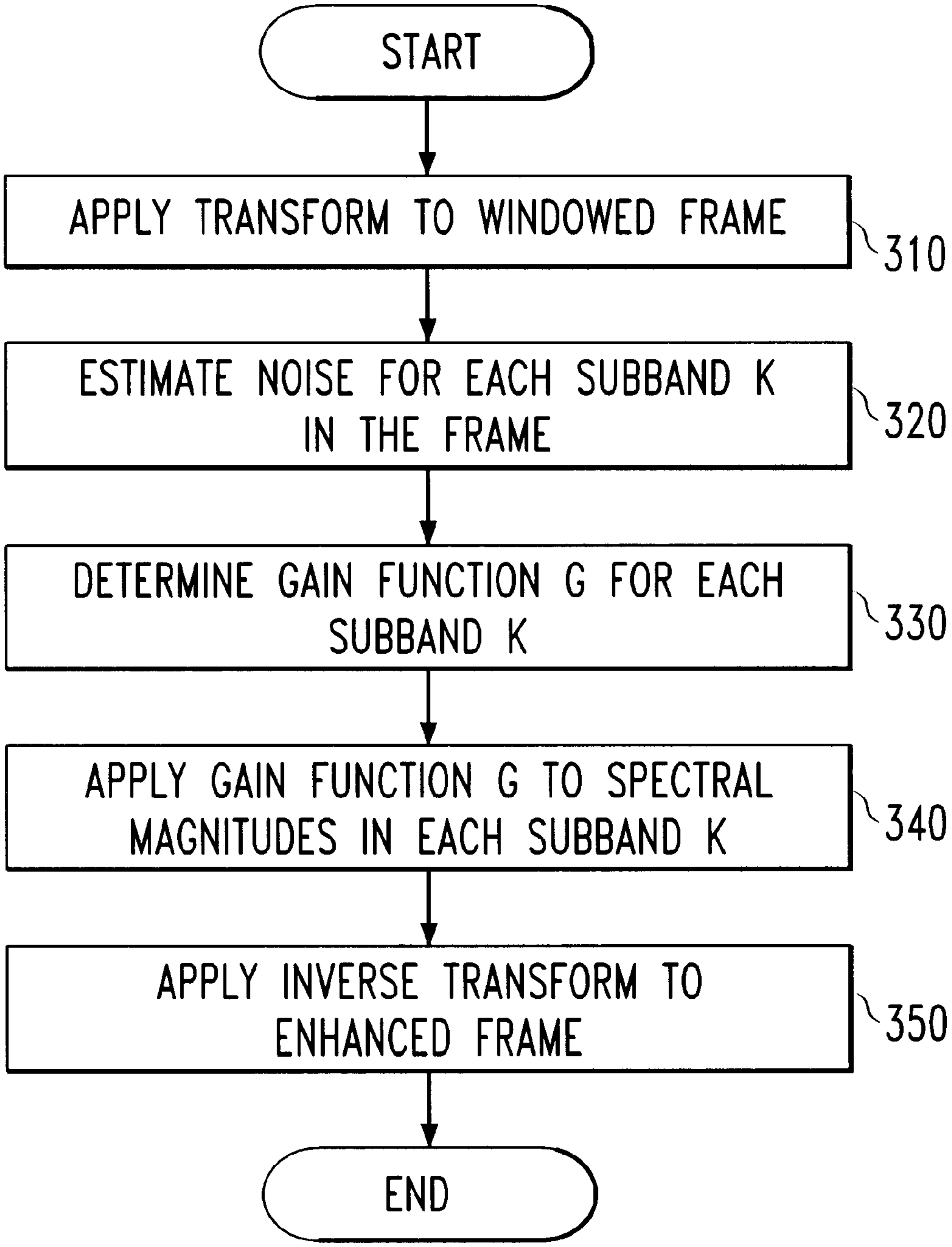
FIG. 3 is a flowchart of steps for a method for enhancing speech signals in accordance with the embodiment of FIG. 1.

The windowed frames of the speech signal are output to a transform module 2, which applies a conventional fast Fourier transform (FFT) to the frame (see step 31 0 of FIG. 3). Spectral magnitudes output by the transform module 2 are used by a noise estimation module 3 to estimate the level of noise in the frame.

3. The Noise Estimation Module

The noise estimation module 3 receives as input the spectral magnitudes output by the transform module 2 and generates a noise estimate for output to the gain function module 4 (see step 320 of FIG. 3). The noise estimate includes conventionally computed a priori and a posteriori SNRs. The noise estimation module 3 can be realized with any conventional noise estimation technique, and may be realized in accordance with the noise estimation technique presented in the above-referenced U.S. Provisional Application No. 60/119,279, filed Feb. 9, 1999.

4. The Gain Function Module

To prevent musical distortions and avoid distorting the overall spectral shape of speech sounds (and thus avoid disturbing the estimation of spectral parameters), the lower limit of the gain, G, must be set to a first value for frames which represent background noise only (a speech pause) and to a second lower value for frames which represent active speech. These limits and the gain are determined illustratively as follows.

4.1 Limiting the a priori SNR

Figure 4:
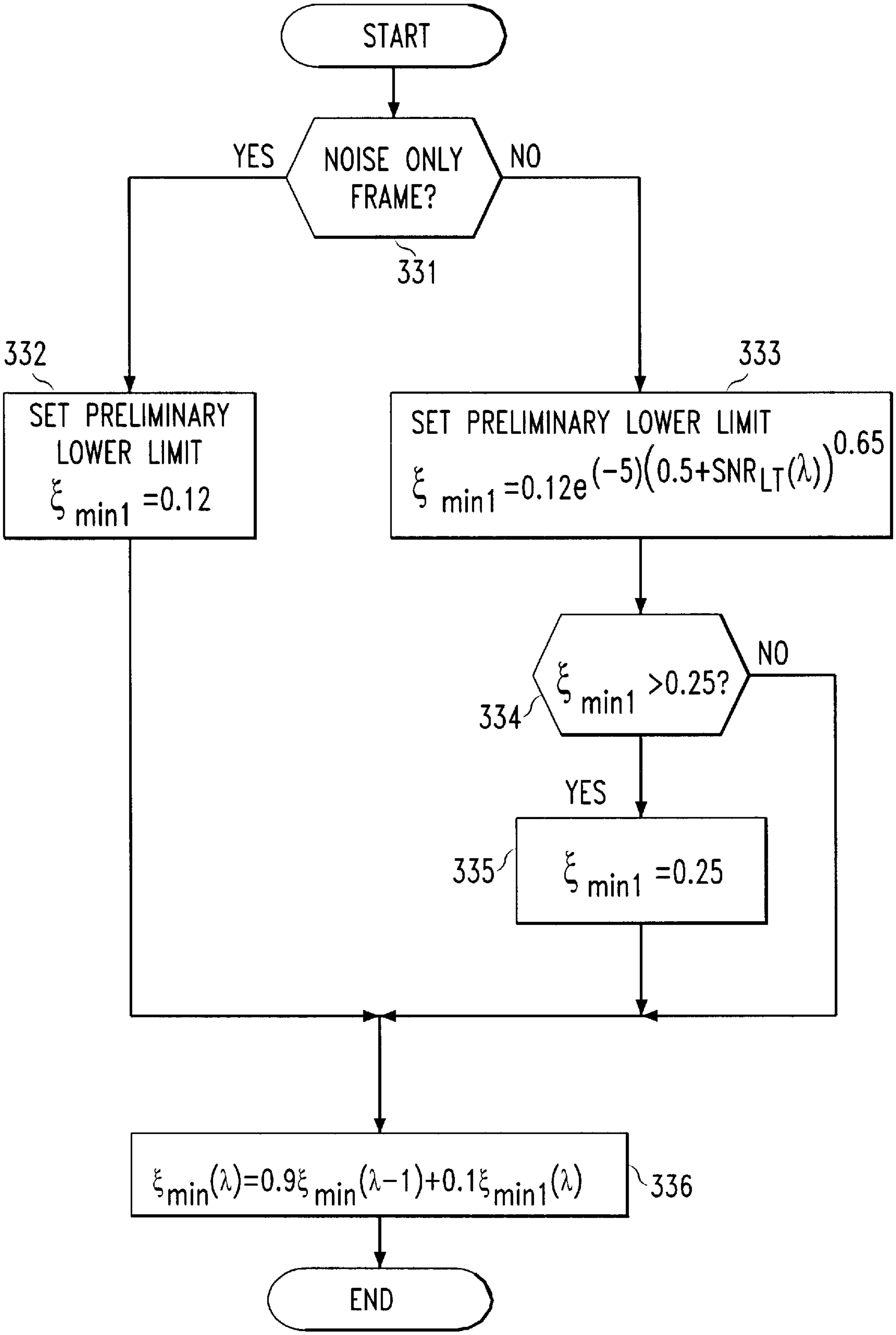
FIG. 4 is a flowchart of steps for a method of adaptively adjusting an a priori SNR value in accordance with the embodiment of FIG. 1.

The gain function, G, determined by module 4 is a function of an a priori SNR value $\xi_k$ and an a posteriori SNR value $\gamma_k$ (referenced above). The a priori SNR value $\xi_k$ is adaptively limited by the gain function module 4 based on whether the current frame contains speech and noise or noise only, and based on an estimated long term SNR for the speech data. If the current frame contains noise only (see step 331 of FIG. 4), a preliminary lower limit $\xi_{min1}(\lambda)=0.12$ is preferably set for the a priori SNR value $\xi_k$ (see step 332 of FIG. 4). If the current frame contains speech and noise (i.e., active speech), the preliminary lower limit $\xi_{min1}(\lambda)$ is set to $$\xi_{min1}(\lambda)=0.12\ \exp(-5)(0.5+SNR_{LT}(\lambda))^{0.65} \quad (3)$$

where $SNR_{LT}$ is the long term SNR for the speech data, and $\lambda$ is the frame index for the current frame (see step 333 of FIG. 4). However, $\xi_{min1}$ is limited to be no greater than 0.25 (see steps 334 and 335 of FIG. 4). The long term $SNR_{LT}$ is determined by generating the ratio of the average power of the speech signal to the average power of the noise over multiple frames and subtracting 1 from the generated ratio. Preferably, the speech signal and the noise are averaged over a number of frames that represent 1–2 seconds of the signal. If the $SNR_{LT}$ is less than 0, the $SNR_{LT}$ is set equal to 0.

The actual lower limit for the a priori SNR is determined by a first order recursive filter:

$$\xi_{min}(\lambda)=0.9\xi_{min}(\lambda-1)+0.1\xi_{min1}(\lambda) \quad (4)$$

This filter provides for a smooth transition between the preliminary values for speech frames and noise only frames (see step 336 of FIG. 4). The smoothed lower limit $\xi_{min}(\lambda)$ is then used as the lower limit for the a priori SNR value $\xi_k(\lambda)$ in the gain computation discussed below.

4.2 Determining the Gain with a Limited a priori SNR

As is known in the art, gain, G, used in speech enhancement preprocessors is a function of the a priori signal to noise ratio, $\xi$, and the a posteriori SNR value, $\gamma$. That is, $G_k=f(\xi_k(\lambda),\gamma_k(\lambda))$, where $\lambda$ is the frame index and k is the subband index. In accordance with an embodiment of this invention, the lower limit of the a priori SNR, $\xi_{min}(\lambda)$, is applied to the a priori SNR (which is determined by noise estimation module 3 ) the as follows:

$$\xi_k(\lambda)=\xi_k(\lambda) \text{ if } \xi_k(\lambda)>\xi_{min}(\lambda)$$

$$\xi_k(\lambda)=\xi_{min}(\lambda) \text{ if } \xi_k(\lambda)\le\xi_{min}(\lambda)$$

Figure 5:
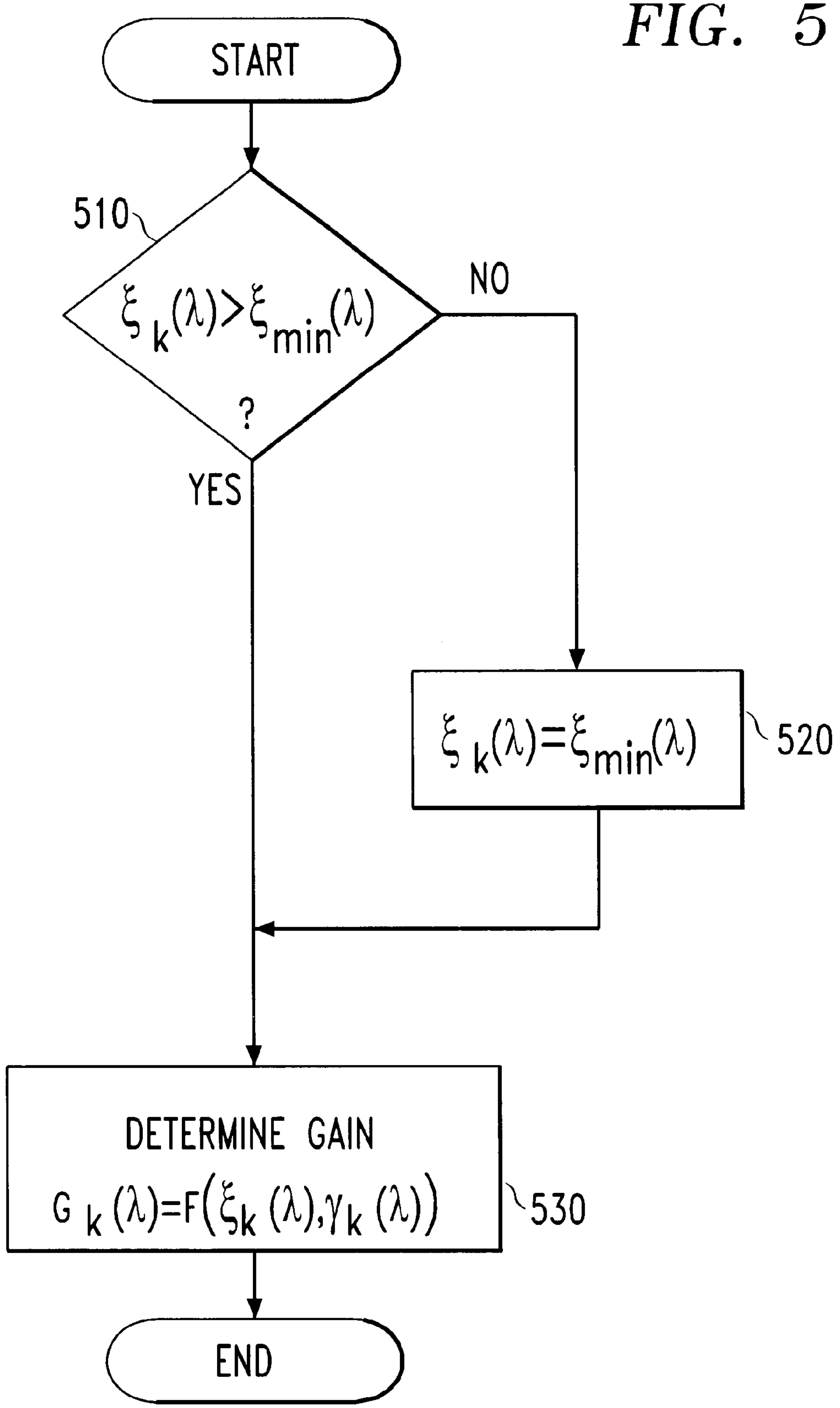
FIG. 5 is a flowchart of the steps for a method of applying a limit to the a priori signal to noise ratio for use in a gain computation.

(see steps 510 and 520 of FIG. 5).

Based on the a posteriori SNR estimation generated by the noise estimation module 3 and the limited a priori SNR discussed above, the gain function module 4 determines a gain function, G (see step 530 FIG. 5). A suitable gain function for use in realizing this embodiment is a conventional Minimum Mean Square Error Log Spectral Amplitude estimator (MMSE LSA), such as the one described in Y. Ephraim et al., "Speech Enhancement Using a Minimum Mean-Square Error Log-Spectral Amplitude Estimator," IEEE Trans. Acoustics, Speech and Signal Processing, Vol. 33, pp. 443–445, April 1985, which is hereby incorporated by reference as if set forth fully herein. Further improvement can be obtained by using a multiplicatively modified MMSE LSA estimator, such as that described in D. Malah, et al., "Tracking Speech Presence Uncertainty to Improve Speech Enhancement in Non-Stationary Noise Environments," Proc. ICASSP, 1999, to account for the probability of speech presence. This reference is incorporated by reference as if set forth fully herein.

5. Applying the Gain Function

The gain, G, is applied to the noisy spectral magnitudes of the data frame output by the transform module 2. This is done in conventional fashion by multiplying the noisy spectral magnitudes by the gain, as shown in FIG. 1 (see step 340 of FIG. 3).

6. The Inverse Transform Module

A conventional inverse FFT is applied to the enhanced spectral amplitudes by the inverse transform module 5, which outputs a frame of enhanced speech to an overlap/add module 6 (see step 350 of FIG. 3).

7. Overlap Add Module; Delay Reduction

The overlap/add module 6 synthesizes the output of the inverse transform module 5 and outputs the enhanced speech signal ŝ(k) to the coder 7. Preferably, the overlap/add module 6 reduces the delay imposed by the enhancement preprocessor 8 by multiplying the left "half" (e.g., the less current 180 samples) in the frame by a synthesis window and the right half (e.g., the more current 76 samples) in the frame by an inverse analysis window (see step 400 of FIG. 2). The synthesis window can be different from the analysis window, but preferably is the same as the analysis window (in addition, these windows are preferably the same as the analysis window referenced in step 200 of FIG. 2). The sample sizes of the left and right "halves" of the frame will vary based on the amount of data shift that occurs in the coder 7 input buffer as discussed below (see the discussion relating to step 800, below). In this case, the data in the coder 7 input buffer is shifted by 180 samples. Thus, the left half of the frame includes 180 samples. Since the analysis/synthesis windows have a high attenuation at the frame edges, multiplying the frame by the inverse analysis filter will greatly amplify estimation errors at the frame boundaries. Thus, a small delay of 2–3 ms is preferably provided so that the inverse analysis filter is not multiplied by the last 16–24 samples of the frame.

Figure 2:
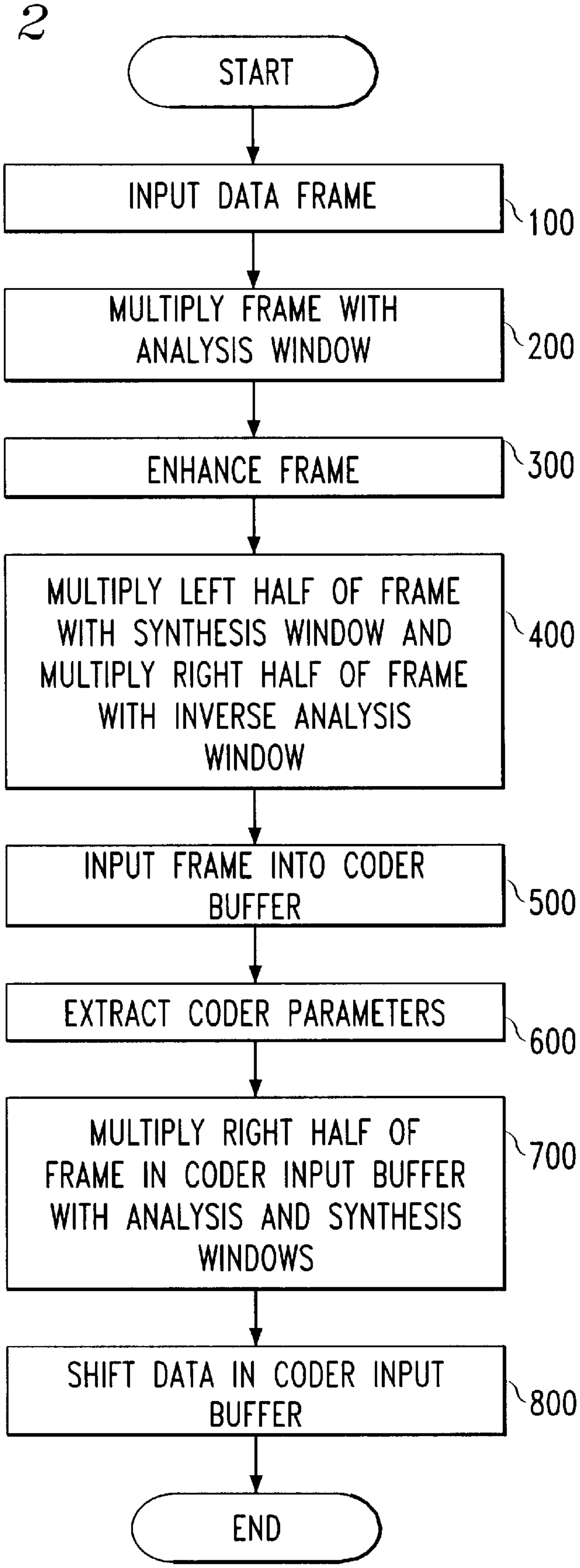
FIG. 2 is a flowchart of steps for a method of processing speech and other signals in accordance with the embodiment of FIG. 1.

Once the frame is adjusted by the synthesis and inverse analysis windows, the frame is then provided to the input buffer (not shown) of the coder 7 (see step 500 of FIG. 2). The left portion of the current frame is overlapped with the right half of the previous frame that is already loaded into the input buffer. The right portion of the current frame, however, is not overlapped with any frame or portion of a frame in the input buffer. The coder 7 then uses the data in the input buffer, including the newly input frame and the incomplete right half data, to extract coding parameters (see step 600 of FIG. 2). For example, a conventional MELP coder extracts 10 linear prediction coefficients, 2 gain factors, 1 pitch value, 5 bandpass voicing strength values, 10 Fourier magnitudes, and an aperiodic flag from data in its input buffer. However, any desired information can be extracted from the frame. Since the MELP coder 7 does not use the latest 60 samples in the input buffer for the Linear Predictive Coefficient (LPC) analysis or computation of the first gain factor, any enhancement errors in these samples have a low impact on the overall performance of the coder 7.

After the coder 7 extracts coding parameters, the right half of the last input frame (e.g., the more current 76 samples) are multiplied by the analysis and synthesis windows (see step 700 of FIG. 2). These analysis and synthesis windows are preferably the same as those referenced in step 200, above (however, they could be different, such as the square-root of the analysis window of step 200 ).

Next, the data in the input buffer is shifted in preparation for input of the next frame, e.g., the data is shifted by 180 samples (see step 800 of FIG. 2). As discussed above, the analysis and synthesis windows can be the same as the analysis window used in the enhancement preprocessor 8, or can be different from the analysis window, e.g., the square root of the analysis window. By shifting the final part of overlap/add operations into the coder 7 input buffer, the delay of the enhancement preprocessor 8/coder 7 combination can be reduced to 2–3 milliseconds without sacrificing spectral resolution or cross talk reduction in the enhancement preprocessor 8.

C. Discussion

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

For example, while the illustrative embodiment of the present invention is presented as operating in conjunction with a conventional MELP speech coder, other speech coders can be used in conjunction with the invention.

The illustrative embodiment of the present invention employs an FFT and IFFT, however, other transforms may be used in realizing the present invention, such as a discrete Fourier transform (DFT) and inverse DFT.

While the noise estimation technique in the referenced provisional patent application is suitable for the noise estimation module 3, other algorithms may also be used such as those based on voice activity detection or a spectral minimum tracking approach, such as described in D. Malah et al., "Tracking Speech Presence Uncertainty to Improve Speech Enhancement in Non-Stationary Noise Environments," Proc. IEEE Intl. Conf. Acoustics, Speech, Signal Processing (ICASSP), 1999; or R. Martin, "Spectral Subtraction Based on Minimum Statistics, " Proc. European Signal Processing Conference, vol. 1, 1994, which are hereby incorporated by reference in their entirety.

Although the preliminary lower limit $\xi_{min1}(\lambda)=0.12$ is preferably set for the a priori SNR value $\xi_k$ when a frame represents a speech pause (background noise only), this preliminary lower limit $\xi_{min1}$ could be set to other values as well.

The process of limiting the a priori SNR is but one possible mechanism for limiting the gain values applied to the noisy spectral magnitudes. However, other methods of limiting the gain values could be employed. It is advantageous that the lower limit of the gain values for frames representing speech activity be less than the lower limit of the gain values for frames representing background noise only. However, this advantage could be achieved other ways, such as, for example, the direct limitation of gain values (rather than the limitation of a functional antecedent of the gain, like a priori SNR).

Although frames output from the inverse transform module 5 of the enhancement preprocessor 8 are preferably processed as described above to reduce the delay imposed by the enhancement preprocessor 8, this delay reduction processing is not required to accomplish enhancement. Thus, the enhancement preprocessor 8 could operate to enhance the speech signal through gain limitation as illustratively discussed above (for example, by adaptively limiting the a priori SNR value $\xi_k$). Likewise, delay reduction as illustratively discussed above does not require use of the gain limitation process.

Delay in other types of data processing operations can be reduced by applying a first process on a first portion of a data frame, i.e., any group of data, and applying a second process to a second portion of the data frame. The first and second processes could involve any desired processing, including enhancement processing. Next, the frame is combined with other data so that the first portion of the frame is combined with other data. Information, such as coding parameters, are extracted from the frame including the combined data. After the information is extracted, a third process is applied to the second portion of the frame in preparation for combination with data in another frame.

What is claimed is:

1. A method for enhancing a speech signal for use in speech coding, the speech signal representing background noise and periods of articulated speech, the speech signal being divided into a plurality of data frames, the method comprising the steps of:

applying a transform to the speech signal of a data frame to generate a plurality of sub-band speech signals;

making a determination whether the speech signal corresponding to the data frame represents articulated speech;

determining the individual gain values and wherein, for a given data frame, the lower limit for gain values is a function of a lower limit for an a priori signal to noise ratio, wherein the lower limit for the a priori signal to noise ratio for the data frame is determined with use of a first order recursive filter which combines a lower limit for an a priori signal to noise ratio determined for a previous data frame and a preliminary lower limit for the a priori signal to noise ratio of the data frame;

applying individual gain values to individual sub-band speech signals, wherein a lower limit for gain values applied for a data frame determined to represent articulated speech is lower than a lower limit for gain values applied for a data frame determined to represent background noise only; and applying an inverse transform to the plurality of sub-band speech signals.

2. The method of claim 1 wherein the step of applying a transform comprises applying a Fourier transform and wherein the step of applying an inverse transform comprises applying an inverse Fourier transform.

3. A method for enhancing a signal for use in speech processing, the signal being divided into data frames and representing background noise information and periods of articulated speech information, the method comprising the steps of:

making a determination whether the signal of a data frame represents articulated speech information;

determining a gain value and wherein, for a given data frame, the lower limit for gain values is a function of a lower limit for an a priori signal to noise ratio, the lower limit for the a priori signal to noise ratio for the data frame determined with use of a first order recursive filter which combines a lower limit for an a priori signal to noise ratio determined for a previous data frame and a preliminary lower limit for the a priori signal to noise ratio of the data frame; and applying the gain value to the signal, wherein a lower limit for gain values applied for a data frame determined to represent articulated speech is lower than a lower limit for gain values applied for a data frame determined to represent background noise only.

4. A method of encoding a speech signal, the speech signal representing background noise and periods of articulated speech, the speech signal being divided into a plurality of data frames, the method comprising the steps of:

applying a transform to the speech signal of a data frame to generate a plurality of sub-band speech signals;

making a determination whether the speech signal corresponding to the data frame represents articulated speech;

applying individual gain values to individual sub-band speech signals, wherein a lower limit for gain values applied for a data frame determined to represent articulated speech is lower than a lower limit for gain values applied for a data frame determined to represent background noise only;

applying an inverse transform to the plurality of sub-band speech signals to produce a data frame of an enhanced speech signal;

multiplying a less current portion of a data frame of the enhanced speech signal with a synthesis window to produce a multiplied less current portion of the data frame;

multiplying a more current portion of the data frame of the enhanced speech signal with an inverse analysis window to produce a multiplied more current portion of the data frame;

adding the multiplied less current portion of the data frame to a multiplied more current portion of a previous data frame of the enhanced speech signal to produce a resulting data frame for use in speech compression; and applying a speech compression process to resulting data frames of the enhanced speech signal.

5. The method of claim 4 wherein the step of applying a speech compression process comprises determining speech compression parameters with use of the resulting data frame.

6. The method of claim 4 wherein the speech compression process comprises a Mixed Excitation Linear Prediction speech compression process.

7. The method of claim 4 wherein the step of applying a transform comprises applying a Fourier transform and wherein the step of applying an inverse transform comprises applying an inverse Fourier transform.

8. A method for enhancing a signal for use in speech processing, the signal being divided into data frames and representing background noise information and periods of articulated speech information, the method comprising the steps of:

making a determination whether the signal of a data frame represents articulated speech information;

determining a gain value, wherein the gain value is limited to be no lower than a first limit value, when the data frame is determined to represent articulated speech, and a second limit value, when the data frame is determined to represent background noise only, wherein the first value is lower than the second value, wherein each of the limit values is a function of a limited a priori signal to noise ratio, and wherein the limited a priori signal to noise ratio for a data frame is determined with use of a first order recursive filter which combines a limited a priori signal to noise ratio determined for a previous data frame and a preliminary lower limit for the a priori signal to noise ratio of the data frame; and applying the gain value to the signal.

* * * * *